United States Patent [19]

Hardy, III

[11] Patent Number: 5,781,598

[45] Date of Patent: Jul. 14, 1998

[54] SYSTEM AND METHOD OF ASYNCHRONOUS DATA TRANSFER THROUGH A PLURALITY OF MODEMS

[76] Inventor: Harmon S. Hardy, III, 2934 Shady Lake Cir., Carrollton, Tex. 75006

[21] Appl. No.: 696,507

[22] Filed: Aug. 14, 1996

[51] Int. Cl.⁶ .............................. H04L 7/00; H04L 25/36; H04L 25/40
[52] U.S. Cl. .................. 375/372; 370/465; 370/468; 370/470; 370/471
[58] Field of Search ...................... 375/372; 37/465, 37/468, 470, 472, 471, 437

[56] References Cited

U.S. PATENT DOCUMENTS

| | | | |
|---|---|---|---|
| H1175 | 4/1993 | Giorgio | 370/118 |
| 4,549,302 | 10/1985 | Heatherington | 375/8 |
| 4,734,920 | 3/1988 | Betts | 375/8 |
| 4,759,017 | 7/1988 | Allan et al. | 375/38 |
| 4,775,987 | 10/1988 | Miller | 375/38 |
| 4,805,167 | 2/1989 | Leslie et al. | 370/84 |
| 4,825,434 | 4/1989 | Shaio | 370/80 |
| 4,862,456 | 8/1989 | Giorgio | 370/118 |
| 4,864,567 | 9/1989 | Giorgio | 370/118 |
| 4,888,765 | 12/1989 | Dyke | 370/95.1 |
| 4,899,337 | 2/1990 | Hirai | 370/80 |
| 4,903,261 | 2/1990 | Baran et al. | 370/94.2 |
| 4,987,570 | 1/1991 | Almond et al. | 370/84 |
| 5,058,133 | 10/1991 | Duncanson et al. | 375/38 |
| 5,065,396 | 11/1991 | Castellano et al. | 370/84 |
| 5,119,402 | 6/1992 | Ginzburg et al. | 375/17 |
| 5,179,661 | 1/1993 | Copeland, III et al. | 395/250 |
| 5,231,649 | 7/1993 | Duncanson | 375/38 |
| 5,293,378 | 3/1994 | Shimizu | 370/94.1 |
| 5,305,318 | 4/1994 | Ozeki et al. | 370/85.7 |
| 5,390,239 | 2/1995 | Morris et al. | 379/93 |
| 5,428,608 | 6/1995 | Freeman et al. | 370/60.1 |
| 5,566,175 | 10/1996 | Davis | 370/84 |
| 5,600,645 | 2/1997 | Boyer et al. | 370/395 |
| 5,604,730 | 2/1997 | GrossgLauser et al. | 370/232 |
| 5,673,266 | 9/1997 | Li | 370/465 |
| 5,680,398 | 10/1997 | Robinson | 370/458 |

*Primary Examiner*—Stephen Chin
*Assistant Examiner*—Mohammad Ghayour
*Attorney, Agent, or Firm*—Steven W. Smith

[57] ABSTRACT

A system and method are disclosed for asynchronously transmitting data from an originating system to a receiving system over first and second channels. The system determines an originating data rate at the originating system, sets a threshold data rate, transmits data in character mode on the first channel when the originating data rate is below the threshold data rate, and transmits data in packet mode on the first and second channels when the originating data rate is above the threshold data rate. The system continuously monitors the originating data rate while transmitting data, and dynamically switches from character mode to packet mode when the originating data rate changes from below the threshold data rate to above the threshold data rate. The system also dynamically switches from packet mode to character mode when the originating data rate changes from above the threshold data rate to below the threshold data rate. Received packets are stored in a plurality of first-in-first-out (FIFO) ring buffers, each having a sequence number matching the sequence number of the packet stored therein. Each received packet is sent from the receiving system to an attached computer when the received packet is completely received, a check sum in the received packet is valid, and there are no missing packets before the received data packet.

22 Claims, 6 Drawing Sheets

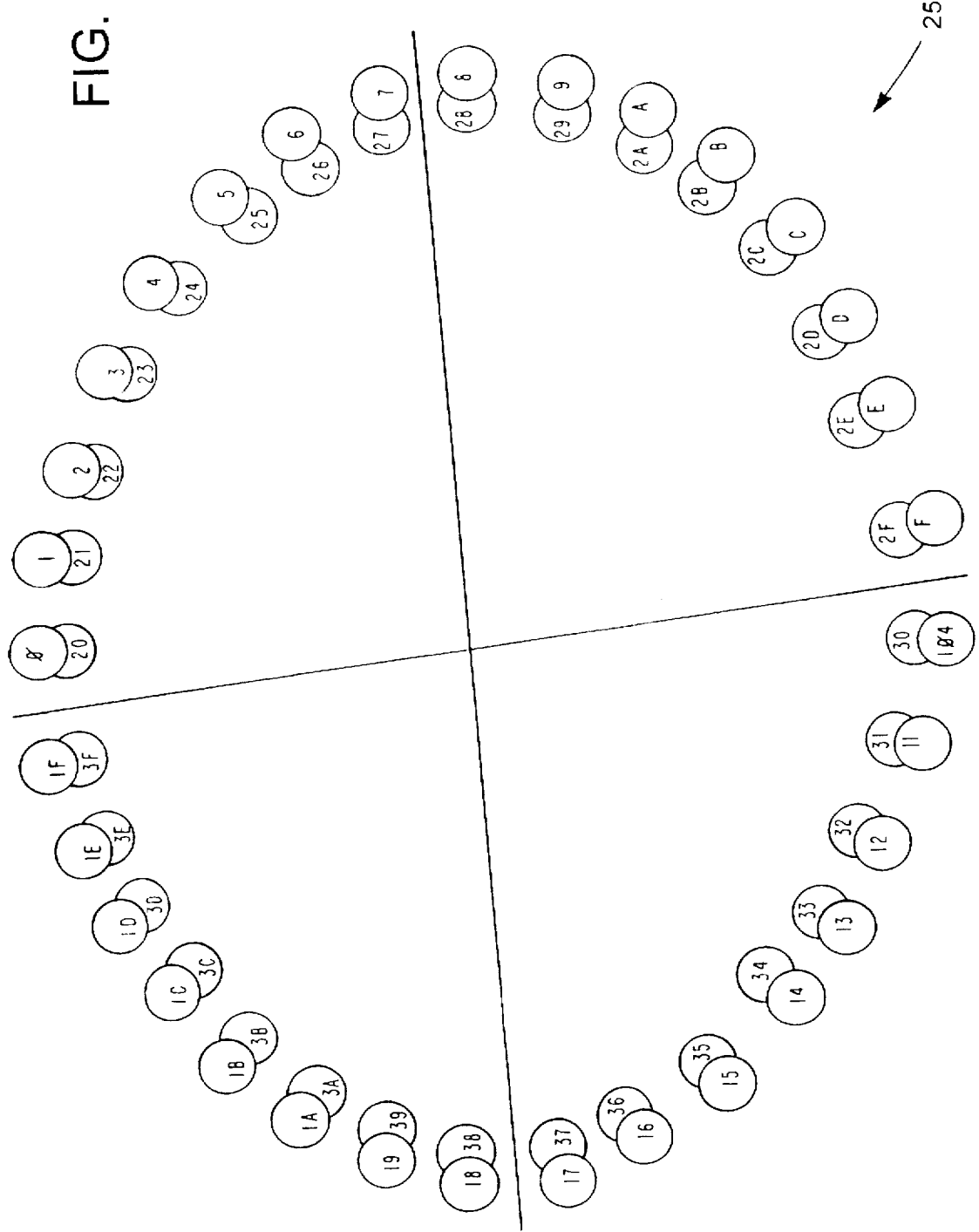

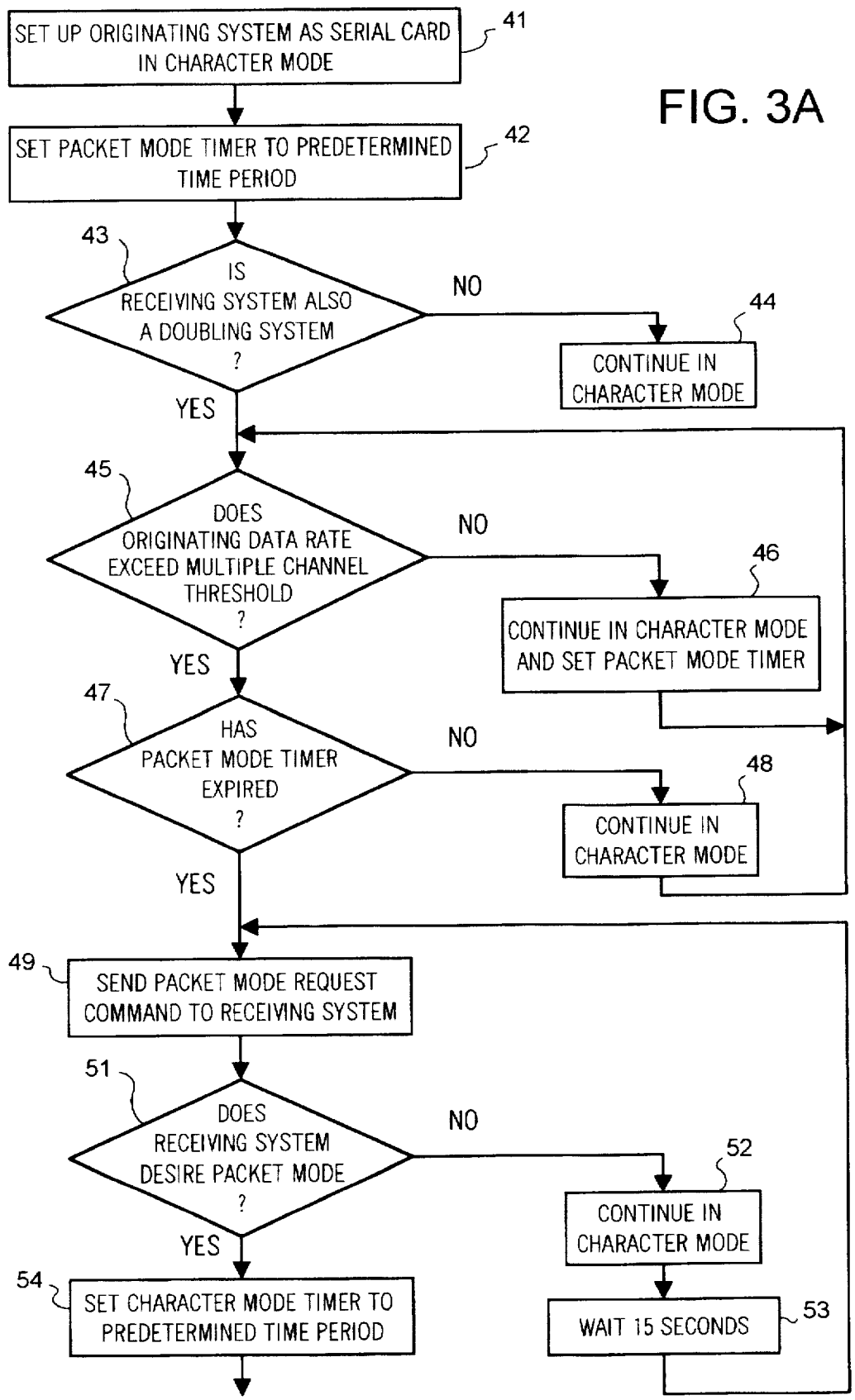

5,781,598

SYSTEM AND METHOD OF ASYNCHRONOUS DATA TRANSFER THROUGH A PLURALITY OF MODEMS

BACKGROUND OF THE INVENTION

1. Technical Field of the Invention

This invention relates to data communication systems and, more particularly, to a system and method of transferring data asynchronously through a plurality of modems.

2. Description of Related Art

Existing data communication systems utilized with personal computers (PCs) utilize a single modem for the transfer of data to and from the PC. These single modems are limited in their capabilities to their maximum data transfer rate which may be, for example 14,400 baud or 28,800 baud.

Several techniques have been utilized over the years to combine two or more low speed telephone channels together for a higher overall transmission speed for computer communications. A first technique known as "bonding" is utilized when two or more channels are established simultaneously for the required bandwidth speed. A second technique known as "demand dial" is utilized when two or more channels are established on demand when additional bandwidth is needed instead of full time bonding. Generally, the type of channels utilized in these techniques are leased lines or digital lines such as Switched 56 and ISDN. These channels require special modems or digital access units for connection to each line. Another device such as a computer or wide area network "router" must be programmed to combine the multiple modems or access units into one higher bandwidth "logical" channel for communications applications.

Because of the difficulty in splitting data across multiple channels, synchronous modems (or standard modems utilized in "sync" mode on dial-up lines) are utilized to aid the computers in this task. Digital line access units are always synchronous. The DCE (modem) connection to the DTE (computer or router) requires a special serial port for each channel, capable of synchronous operation. However, the standard serial port on a PC (COM port) is asynchronous. Therefore, a custom synchronous port is needed along with a program or device driver to split and combine data sent and received. Even then, many off-the-shelf communication programs do not work with this arrangement.

The formatting of the data is usually in the form of a packet. Even a single character must be sent in a larger packet. Burst type data transmissions must be buffered for a steady synchronous transmission. Asynchronous modems have not been used because they are slower than synchronous modems when the baud rates are the same, due to the requirement for stop and start bits. Running the asynchronous modems at the next higher programmed baud rate overcomes the speed disadvantage, but the modem must send a signal to the PC COM port to stop sending data when the modem's buffer is nearly full. When the modem has nearly emptied its buffer, it sends another signal to the PC COM port to resume sending data. This starting and stopping of the data flow can overwhelm the computer's ability to compensate for data skewing across a plurality of modem channels. This is particularly true for PCs because they have very long character interrupt response times.

Existing computer communications programs are written to handle a standard asynchronous PC COM port with a standard modem. The primary way to increase asynchronous communication speed has been to develop faster modems.

There have also been systems which transfer data simultaneously over multiple telephone lines. These systems, however, utilize either synchronous data transmission, or utilize time multiplexing techniques for asynchronous data that require that all channels be established prior to the start of data transfer. Thus, their setup time is excessive, and they cannot dynamically add or delete asynchronous data channels as the required data rate changes, while maintaining data flow smoothly enough that the communication software on the host computer does not detect an error.

Although there are no known prior art teachings of a solution to the aforementioned deficiency and shortcoming such as that disclosed herein, U.S. Pat. No. 4,864,567 to Giorgio; U.S. Pat. No. 5,293,378 to Shimizu; U.S. Pat. No. 5,390,239 to Morris et al.; and U.S. Pat. No. 5,305,318 to Ozeki et al. discuss subject matter that bears some relation to matters discussed herein. U.S. Pat. No. 4,864,567 to Giorgio (Giorgio) discloses a multi-line modem system which provides a plurality of telephone lines to a computer connection. The system is capable of transmitting and receiving digital computer data at throughput rates that exceed those of single line modem systems. The Giorgio system determines the number of available telephone lines, sequences through a series of telephone re-dials, and acknowledges all connections. When the last connection is verified, serial data transfer begins over multiple telephone lines using time multiplexing techniques that provide a throughput rate that is equal to a single modem's data throughput rate times the number of telephone lines available.

Giorgio, however, is essentially a custom modem which requires that all channels be established prior to the start of data transfer. Thus, the setup time is excessive, and Giorgio cannot dynamically add or delete data channels as the required data rate changes, while maintaining data flow smoothly enough that the communication software on the host computer does not detect an error. Also, Giorgio requires the use of a "hunt" group of lines on the receiving (answering) side of the modem connection. Additionally, Giorgio sends bytes of data instead of packets, sending each succeeding byte over a different telephone line. There is no teaching in Giorgio of any error recovery in the event of line errors.

U.S. Pat. No. 5,293,378 to Shimizu (Shimizu) discloses a packet transmission system which divides packets into six transmission frames. Delimiters are added to the first and last frames, and four transmitters send out the six transmission frames in accordance with sequence numbers at a rate at which the signal can be transmitted by way of time division transmission lines. Four receivers receive the transmission frames, and a reception controller and restoring circuit reassemble the frames back into the original packet in accordance with the sequence numbers and delimiters.

Shimizu, however, does not teach or suggest dynamically changing the number of time division transmission lines while data is being transmitted. Shimizu applies sequence numbers in advance to the transmission lines and the transmitters, and cannot change this allocation on the fly.

U.S. Pat. No. 5,390,239 to Morris et al. (Morris) discloses a method of simultaneously transmitting a digital data file over a plurality of telephone lines. The data file is segregated into smaller blocks of data, sequentially addressed, and concurrently transmitted over a plurality of telephone lines until all the blocks have been transmitted. The blocks are reassembled at the receiving end to form the original data file.

Morris, however, by transmitting each successive block of data over the next available telephone line, sets up a method of synchronously transmitting data blocks. Therefore, Morris does not take advantage of the fact that some telephone lines may be able to transmit data at a faster rate than others. Thus, Morris does not teach or suggest a method of asynchronously transmitting data over multiple data lines that sends more data over faster lines and dynamically selects data lines and transmission modes on the fly without interrupting host computer communication software.

U.S. Pat. No. 5,305,318 to Ozeki et al. (Ozeki) discloses a method of controlling a data transmission from a sending terminal to a receiving terminal through a plurality of data channels in an integrated services digital network (ISDN). After connection messages are exchanged over the network, the number of data channels to be simultaneously used for the data transmission is determined, and the data is transmitted using the determined number of channels.

Ozeki, however, utilizes synchronous data transmission over the ISDN network. Ozeki does not teach or suggest a system or method of dynamically transmitting asynchronous data over multiple data channels while selecting transmission modes on the fly without interrupting host computer communication software.

Review of each of the foregoing references reveals no disclosure or suggestion of a system or method such as that described and claimed herein.

In order to overcome the disadvantage of existing solutions, it would be advantageous to have a system and method of dividing a single asynchronous data stream into two asynchronous data streams, and transmitting and receiving the data streams with two attached modems utilized in asynchronous mode. Such a system and method would dynamically select data lines and transmission modes on the fly without interrupting host computer communication software. The present invention provides such a system and method.

SUMMARY OF THE INVENTION

In one aspect, the present invention is a method of asynchronously transmitting data from an originating system to a receiving system over first and second channels. The method begins by determining an originating data rate at the originating system, setting a threshold data rate, transmitting data in character mode on the first channel when the originating data rate is below the threshold data rate, and transmitting data in packet mode on the first and second channels when the originating data rate is above the threshold data rate.

The method may also include the steps of continuously monitoring the originating data rate while transmitting data, dynamically switching from character mode to packet mode when the originating data rate changes from below the threshold data rate to above the threshold data rate, and dynamically switching from packet mode to character mode when the originating data rate changes from above the threshold data rate to below the threshold data rate.

In another aspect, the present invention is a device for asynchronously transmitting data from an originating system to a receiving system over first and second channels. The device comprises means for determining an originating data rate at the originating system, means for setting a threshold data rate, means for transmitting data in character mode on the first channel when the originating data rate is below the threshold data rate, and means for transmitting data in packet mode on the first and second channels when the originating data rate is above the threshold data rate.

The device may also include means for continuously monitoring the originating data rate while transmitting data, means for dynamically switching from character mode to packet mode when the originating data rate changes from below the threshold data rate to above the threshold data rate, and means for dynamically switching from packet mode to character mode when the originating data rate changes from above the threshold data rate to below the threshold data rate.

BRIEF DESCRIPTION OF THE DRAWINGS

The invention will be better understood and its numerous objects and advantages will become more apparent to those skilled in the art by reference to the following drawing, in conjunction with the accompanying specification, in which:

FIG. 2 is an illustrative drawing of a First-In-First-Out (FIFO) ring buffer array utilized in the preferred embodiment of the system of the present invention;

FIGS. 3A–3C are a flow chart illustrating the steps performed by an originating dual-channel asynchronous data transfer system when performing the method of the present invention.

DETAILED DESCRIPTION OF EMBODIMENTS

The present invention is a dual-channel asynchronous data transfer system which smoothly switches "on the fly" between a character mode and a packet mode. A threshold is set within the system for a maximum data transfer rate utilizing a single modem. When the data rate reaches the maximum threshold, the originating system automatically places a telephone call with its second modem to the second modem in the receiving system. Upon the establishment of a successful connection between the second modems, the system switches from character mode to 255-character packet mode. Packets are then tagged with sequence numbers and sent smoothly across both channels to the receiving system. Data may be sent at a higher rate over one channel than the other, depending on the maximum rate which each channel can handle. The receiving system places the packets in proper order and then converts the packets back into a continuous character stream. If the data flow drops below the threshold for dual modem use, the system switches back to character mode and optionally hangs up the second modem connection.

The dual-channel asynchronous data transfer system of the present invention provides open transparent point-to-point data communications with another dual-channel asynchronous data transfer system or a standard PC asynchronous COM port and modem. The dual-channel asynchronous data transfer system functions as a standard asynchronous serial COM port unless it detects another dual-channel asynchronous data transfer system on the other end of the data call. When a call is established between an originating (calling) system and a receiving (called) system, the originating system transmits a non-intrusive three-character probe just after carrier detection and then waits up to five seconds for a response from the receiving system. If a response probe is received, a handshake is established between the systems utilizing a system protocol which includes all the necessary thresholds, telephone numbers, and error control parameters to begin data transfer. The systems are interchangeable as originating or receiving systems, depending on who initiates the data call.

Figure 1:
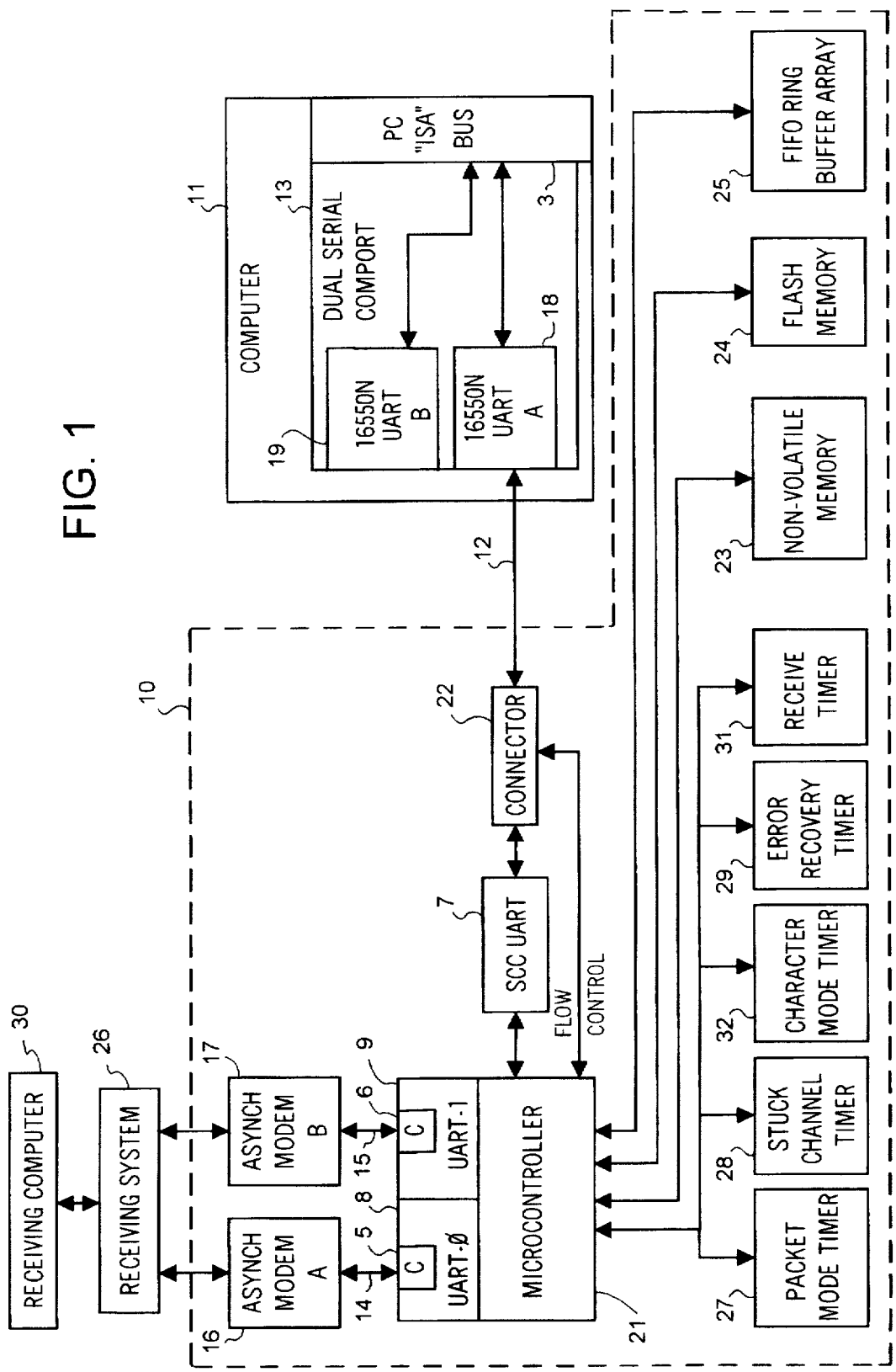
FIG. 1 is a simplified block diagram of one embodiment of the dual-channel asynchronous data transfer system of the present invention.

FIG. 1 is a simplified block diagram of one embodiment of the dual-channel asynchronous data transfer system of the present invention. The dual-channel asynchronous data transfer system 10 comprises a hardware part and a software part. The hardware in the preferred embodiment is configured as a plug-in adapter card that appears to a computer 11 and its communication software to be a standard serial COM card. Functionally, however, the hardware and software of the present invention may be implemented outside the computer 11 as a "black box" or even as a "smart" serial cable. This arrangement looks like a typical external modem with its serial cable 12 connected to the computer's internal asynchronous serial COM port 13. On the line side of the black box, however, there are two or more serial cables 14 and 15 running to two or more external asynchronous modems 16 and 17. Although in the embodiment described herein, the dual-channel asynchronous data transfer system is utilized with a computer, it should be recognized that the present invention may operate in conjunction with any serial device.

The system utilizes the two external asynchronous modems 16 and 17 to achieve twice the data throughput of a single modem, and to achieve system redundancy. The system can be addressed COM1 through COM8 with five 8-bit interrupts (IRQs) and two 16-bit IRQs, if installed in a PC 16-bit slot. The hardware card plugs into a PC Industry Standard Architecture (ISA) BUS connector 3 inside the computer 11. To the computer, the card looks just like a standard serial COM card with an enhanced 16550N Universal Asynchronous Receiver Transmitter (UART).

On the hardware card, there are two 16550N UARTS 18 and 19. These high performance "550" class UARTs default to a compatible "450" mode. The UARTS serially interface through a dual-channel Serial Communications Controller (SCC) class UART 7 to a microcontroller 21, which may be, for example, an industry standard 25-MHz microcontroller. The microcontroller 21 controls all system operations and buffering. When the computer 11 sends any commands or characters through UART 18, the SCC UART 7 and the microcontroller 21 capture them, and the microcontroller either sends them directly to the rear bracket connector 5 or stores them in a First-In-First-Out (FIFO) ring buffer array 25 for later transmission. The same is true for commands or characters received from other systems. UART-0 (8) and UART-1 (9) convert bytes taken from the FIFO buffer array 25 to an asynchronous data stream for modem A 16 or modem B 17. UART-0 (8) and UART-1 (9) may be incorporated in the microcontroller 21 as shown in FIG. 1, or they may be external to the microcontroller.

The modems 16 and 17 utilized in the dual-channel asynchronous data transfer system are error-correction modems. In addition, a packet check sum method is utilized for detecting internal and external errors with the attached modems. Such errors may occur during a lockup, retrain, or lost carrier situation. Should an error occur in one of the modems, the system attempts to communicate on the other good modem by retransmitting the packets lost in the problem modem, without any indication to the communication software program in the computer 11. Once this is accomplished, communications continue uninterrupted on the single good modem. If any packets cannot be recovered, application software must deal with the lost data. Meanwhile, the system 10 attempts to correct the problem modem by hanging up the call, resetting the modem, and then automatically re-connecting the call. The hang-up is preferably forced with a DTR signal, or may be forced with an escape character sequence followed by an ATHO or equivalent command string. The system hang-up strings are stored in a non-volatile memory 23. After a successful re-connection, double data flow is resumed.

The dual-channel asynchronous data transfer system 10 has a simple command structure that can be enabled when using any simple communications program to send a character escape sequence similar to what standard modems use to enter command mode when they are on line. Once in command mode, operational parameters such as telephone numbers, thresholds, etc. are set and saved in the non-volatile memory 23. In-the-field updates are easily achieved by storing the system resident program in a "Flash" memory 24.

When installing the dual-channel asynchronous data transfer system 10 in a personal computer (PC), the PC's communication software normally initializes the first modem (Modem A) 16. The system stores in its non-volatile memory 23, a default initialization string which it sends to the second modem (Modem B) 17. The system communicates with the second modem 17 at a default rate of 57,600 baud. This rate may be overridden with different rate settings.

The dual-channel asynchronous data transfer system 10 performs speed conversion and buffering between the computer 11 and the attached modems 16 and 17. To accomplish this, the system controls the flow of data using hardware handshake lines RTS and CTS. Alternatively, the system may utilize soft flow control using XON/XOFF characters. Hardware flow control or soft flow control must be selected within the computer 11, but most computer communication software programs and modems default to hardware flow control.

FIG. 2 is an illustrative drawing of the First-In-First-Out (FIFO) ring buffer array 25 utilized in the preferred embodiment of the system of the present invention. There are two identical ring arrays, one for transmit, and one for receive. Each small circle in FIG. 2 (for example, circle number 1) represents a 256-character ring buffer. When the data transmission rate is not doubled on two or more channels, or when the system card is not communicating with another system card, the card performs the functions of a standard COM card except that characters and commands are always buffered. This is accomplished with the FIFO ring buffer array 25. When the microcontroller 21 captures a character to be transmitted, it places it into one of the ring buffers at the next available memory location. When the top of the ring buffer is reached, the next character is placed at the beginning of the ring buffer, with the next available locations moving around the ring toward the top again. Shortly, the microcontroller retrieves this character and sends it out rear connector 5, or through connector 22 to the computer 11 or other connected serial device. An identical ring buffer is utilized for received characters.

Each of the ring buffers can hold up to 256 characters at one time without an overflow. To prevent an overflow, the hardware uses data flow control just like a modem performing speed conversion. When a ring buffer is 80% fill, it sends a command signal to the sending device to stop sending data. When the ring buffer has been emptied to the 20% level, a command is sent to start the data flow again.

If data is received from the computer 11 faster than a single modem channel can support, the transmitted data rate is doubled on two channels. The system 10 accumulates data and forms data packets that are exactly 255 characters in length. These 255-character packets may be transmitted and received by the system on either channel, and more data may be passed on one channel than the other. To accomplish this, several ring buffers are utilized for the transmit and receive sides. The system fills subsequent ring buffers by turning off flow control to the first ring buffer and allowing the first buffer to overflow to the subsequent ring buffers. When a character overflows the current ring buffer in use, it is reassigned to the next new ring buffer. The individual ring buffers are arranged into the larger logical ring buffer array 25.

When the system 10 is ready to send a packet, a transmission channel is chosen "on the fly", and a sequence number with a check sum is then added to the packet. Waiting until the last moment to make the transmit path decision reduces the amount of asynchronous data skewing. Received packets are stored in sequence order, one to each ring buffer within the larger logical receiving ring buffer array 25. The packets are checked for errors and final packet assembly before being sent smoothly to the computer 11. As the flow of data slows down, the system switches back to a normal mode of operation in which one ring buffer and one modem channel are utilized.

One of the features of the system of the present invention, when enabled, is to continue operation even when a channel fails. This is accomplished by re-transmitting packets that were lost when the channel failed. The receiving system 26 may optionally acknowledge each error-free packet it receives. The originating system 10 looks for this acknowledgment before re-using the ring buffer from which the packet was transmitted. If an acknowledgment is not received for a particular packet the originating system 10 re-transmits the packet one time. After that, the communication software in the computer 11 must provide any additional error recovery.

Software controls all normal and extended operational functions of the system 10. In the preferred embodiment, the software is written in the native assembly language of the microcontroller 21 and employs an Event (Interrupt) and Polling (Schedule) architecture. On power up, the software performs hardware diagnostics before executing its normal and extended functions. The software is stored in the Flash memory 24, and can be updated in the field using a PC and a simple communication program.

In normal serial data transmission and reception, the software polls the RS232 signals from both the modem side and the computer side of the hardware. These RS232 signals are passed through transparently just like a normal serial adapter card. The software then sends or receives asynchronous characters (data). Instead of the normal serial adapter card "hard wiring", however, a ring buffer array 25 is utilized on both receive and transmit to temporarily store the characters before being sent transparently through the system. "Event" incoming characters are stored sequentially in each buffer until character 257, which then is stored at the beginning of the buffer at location 1. "Polled" and "Event" outgoing characters are retrieved sequentially from the same buffer until character 257, which then is retrieved from location 1. Unlike existing serial adapter cards, if more characters are received in the ring buffer than are transmitted, and the 80% threshold is exceeded, the RS232 hardware flow control signals are overridden to stop the incoming or outgoing character flow.

If the system detects a dial command, and shortly thereafter a carrier detect signal is received, the software attempts to determine if there is another dual-channel asynchronous data transfer system on the other side of the modem connection. Detection of another such system causes a software handshake, exchange of operational parameters, and a switch to packet (dual-channel) mode. If another dual-channel asynchronous data transfer system is not detected on the other side of the connection, the system performs as a normal serial device described above. The system 26 on the receiving (called) side of the connection is presumed hereafter to be an identical dual-channel asynchronous data transfer system. The receiving system 26 is in "Answer mode" at this point, and is connected to a receiving serial device which may be a receiving computer 30. After detecting a carrier, the receiving system 26 waits a short time to receive a software detect sequence that includes a 3-character probe packet from the originating system 10. If a software detect sequence is received, the receiving system switches to an extended mode in which the data transfer system 10 embeds software commands in the sent and received data character stream. If the detect sequence is not received, the receiving system performs as a normal serial device.

The embedded commands in extended mode are removed from the data stream before being sent to the receiving computer 30. Extended mode operation on a single channel is much like normal serial operation except that the software monitors the ratio of data flow versus stopped data flow. A threshold is set to determine when more data is received from the computer 11 than can be sent in a set period of time. If the threshold is exceeded, the software attempts to add another serial channel so that the data can flow uninterrupted.

After reaching the data flow rate threshold, a preset packet mode timer 27 starts counting down to zero. If the data flow rate then drops below the threshold, the timer 27 is reset to its original value. The packet mode timer 27 prevents the system from adding channels for bursty data flow that does not need additional bandwidth. If the timer reaches zero, the software initiates the process of adding more serial channels. If the originating system 10 needs an additional serial channel, it requests permission from the receiving system 26 to double the transmitted data rate. After receiving permission, the originating system 10 dials the receiving system 26 using the phone number that was sent to it during the software detect handshake sequence. The receiving system may also send a "no permission required" command to the originating system. If the data flow rate at the receiving system 26 reaches its flow rate threshold, and its packet mode timer goes to zero, this command allows the originating system 10 to add a channel and double the transmitted data rate without requesting permission. The originating system always dials for normal and error recovery conditions.

Once the new channel is successfully established, the software disables normal flow control between the system 10 and the computer 11. This could cause a buffer overflow, and lost data, but instead of allowing characters to be lost, the software assigns the overflow characters to a new empty buffer in the ring buffer array 25. When the new buffer overflows, then yet another new buffer is assigned to the overflow characters. This continues until eight buffers have been assigned at which point flow control is re-established.

In the embodiment illustrated in FIG. 2, the system maintains 32 transmit buffers, numbered 0 through 1F (HEX), and arranged in a circular ring. Each buffer has two sequence numbers such as, for example, 3 and 23 (HEX). After all 32 buffers have been utilized, they are re-numbered 32 through 63 (decimal). After all of the buffers have been used again, the numbering is switched back to 0 through 1F (HEX). The two sequence numbers are utilized by the receiving system 26 for packet order range control.

While the buffers are being filled and numbered, the software retrieves characters from the first buffer to be sent out to one of the modems 16 and 17. When the first buffer becomes empty, the software determines whether there are more buffers that need to be emptied. If there is another buffer available, but not full, the software continues to empty it and sends characters to the first serial channel modem 16 in "character" mode. If the next buffer is full, the software switches to "packet" mode, adds a leading sequence number and a following check sum byte, and sends the complete buffer contents as a packet on the first available serial channel. The software then checks for more full buffers and, if found, sends them as packets on the next available serial channel. Once again, if the software finds that the next buffer is not full, it switches back to character mode and continues sending characters on the first serial channel.

After the buffer packet has been sent, the empty buffer is conditionally available for re-use. The software has three packet error recovery modes. The first mode is no recovery, and the buffer is immediately available for re-use. The second mode determines whether there has been a possible channel error condition, and if so, the software marks this buffer for a one time re-transmit. If no channel error condition is detected, the buffer is immediately available for re-use. The third mode seeks an "ACK" command sent by the receiving system 26 that the packet was received without errors. If the ACK command has not been received, the buffer is re-transmitted one time.

Sometimes the next available serial channel is the same one the system 10 just utilized. This is normal when other channels are stopped by the connected modems 16 and 17 because of their own flow control or a slower telephone line speed. However, the software does not allow more than eight packets in a row to go down the same channel, because this could indicate that another channel is "stuck". If the eighth packet is reached, a stuck-channel timer 28 is started, and the software waits a period of time for another channel to become available. If a channel does not become available within the allowed time period, the software flushes all packets that have not been marked for re-use or have not been "ACK'ed", and switches back to "character" mode on the channel on which the last seven packets were sent.

Next, an error recovery timer 29 is started for the unavailable stuck channels. A channel can become stuck for many reasons such as line noise, modem character error correcting, and modem carrier signal re-training. If these channels become available again before the error recovery timer 29 expires, the system 10 switches back to packet mode and resumes normal multiple channel operation. If these channels do not become available before the error recovery timer expires, the stuck channels are closed or hung up, and the modem for that channel is re-initialized. Then, if the data flow rate is still above the data rate threshold, the originating system 10 places another phone call to re-establish the serial channel. The system 10 continuously attempts to add channels as long as the data flow rate is above the threshold, and the computer communication software maintains the original connection. Only if the last remaining channel develops a problem is the computer communication software notified of the problem. This notification may take the form of a loss of modem carrier signal or a continuously stopped flow control condition.

When the receiving system 26 is in "character" mode, it receives characters into its normal single buffer. This buffer is emptied in the normal way with the characters being sent immediately to the receiving computer 30. If a "packet" mode command is received, a new receive buffer matching the packet sequence number is assigned for the arriving packet. As noted above, the system maintains at least 32 receive buffers arranged in a circular ring. Each buffer has two sequence numbers used to place arriving packets into the buffer ring. The system continues in packet mode until a "character" mode command is received. At that time, all remaining packet characters are sent to the receiving computer 30, and a new single character mode buffer is assigned for the incoming characters.

Characters from the packet are not sent to the receiving computer 30 until the packet is completely received, and the packet check sum byte is validated. Also, characters from the packet are not sent to the receiving computer if the packet is received out of sequence number order, which is normal for asynchronous modem data flow between multiple serial channels. If the third packet error recovery mode is enabled, an "ACK" command is sent to the originating system 10 acknowledging the packet was properly received.

Ideally, packets are received in order from the multiple serial channels. For example, with two equivalent data rate channels operating, packet sequence number one is received from channel one; packet sequence number two is received from channel two; packet sequence number three is received from channel one; and so on. When a group of packets are received without errors, and the packets have been placed in sequence order without gaps due to missing packets, the packets are sent to the receiving computer 30. Often, however, packets are received with previously numbered packets missing. For example, packets one, three, five, and seven may arrive on the first channel, and packets two, four, eight, and nine may arrive on the second channel. Packets one through five are placed in sequence by the receiving system 26, and if these packets are without errors, they are sent to the receiving computer 30. Packets six and seven, however, are missing. Therefore, packets eight and nine cannot be sent to the computer 30 until the missing packets arrive or are re-transmitted by the originating system 10.

When each packet is received, a receive timer 31 is started. Upon expiration of the receive timer, the received packet is sent to the receiving computer 30 even if packets before it are still missing. Usually the missing packets arrive or are re-transmitted by the originating system 10 before the receive timer 31 expires. If the missing packets are received after the receive timer has expired, the late-arriving packets are thrown away as out-of-range packets. If a received packet is a re-transmitted packet, but an error-free packet has already been received for that sequence number, the re-transmitted packet is thrown away. This can occur when the originating system 10 receives an erroneous indication that there was an error, or when the originating system 10 does not receive an "ACK" command from the receiving system 26 in the third error recovery mode, and in fact, no error condition exists.

If data packets are received in the receiving system 26 faster than can be accepted by the receiving computer 30, the buffers fill up. When there are only eight sequence buffers remaining for a given channel, the receiving system no longer accepts out of order packets. At that time, the software sends a stop flow command to the modem for that serial channel. This out of order situation may be caused by channel data skewing, which is normal for Public Switched Telephone Network (PSTN) and asynchronous modem operation. The receiving system 26 stops the data flow on the faster channel which is ahead of the other, in order to allow the slower channel to catch up. The receiving system 26 sends the stop flow command when there are only eight buffers left because the originating system 10 will not allow more than eight packets in a row to be transmitted on the same channel. When a packet is received on the slower channel within four sequence numbers of the last packet received on the faster channel, the receiving system 26 sends a flow start command to its modem to restart the faster channel.

In this manner, the receiving system 26 attempts to keep the sequence numbers of the packets received on each channel as close together as possible. For example, if Channel A is twice as fast as Channel B, Channel A may transmit packets 1 and 2 while Channel B transmits packet 3. Channel A may then transmit packets 4 and 5 while Channel B transmits packet 6. This "leveling" of the data flow serves several functions. First, the overall data rate is generally maximized when the two channels are transmitting closely numbered packets. Second, by keeping the channels relatively even, if a channel goes bad, the amount of data lost is minimized. Third, if a faster channel gets too far ahead of a slower channel, and there are gaps in the packets received from the faster channel, the slower channel may not fill in the gaps with the missing packets before the receive timer 31 expires. If the receive timer expires, data from the slower channel is discarded as out-of-range packets. Finally, keeping the packet numbers relatively even smooths the data flow and enhances compatibility with off-the-shelf computer communication software programs which are designed for smooth, single-modem communications.

Whenever the data rate drops below the data rate threshold for multiple channel operation, a character mode timer 32 is started. After a predetermined time period in which the character data flow rate is below the threshold, the system that originally requested to double the transmitted data rate sends a command to the other system for permission to close the excess channel. If the other system is also below threshold, it responds with an "OK-to-close" command. The additional serial channel is then closed or "hung up", leaving only the original single serial channel open. If the other system is above its multiple channel threshold, however, it rejects the channel close command, and takes control of maintaining the multiple channels. The new controlling system is now responsible for closing the excess channel when the data rate falls below its threshold.

Figure 3B:
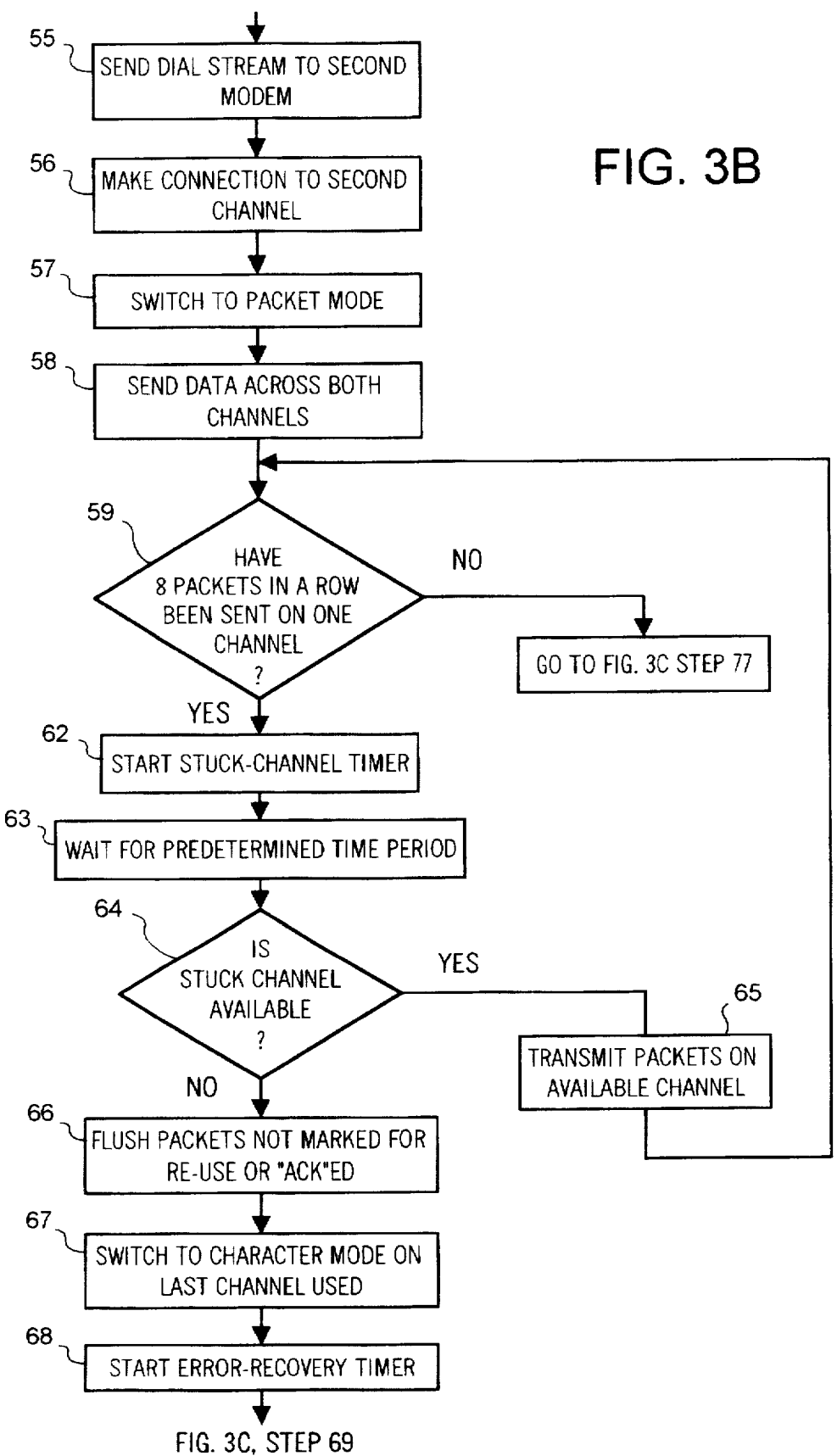
Figure 3C:
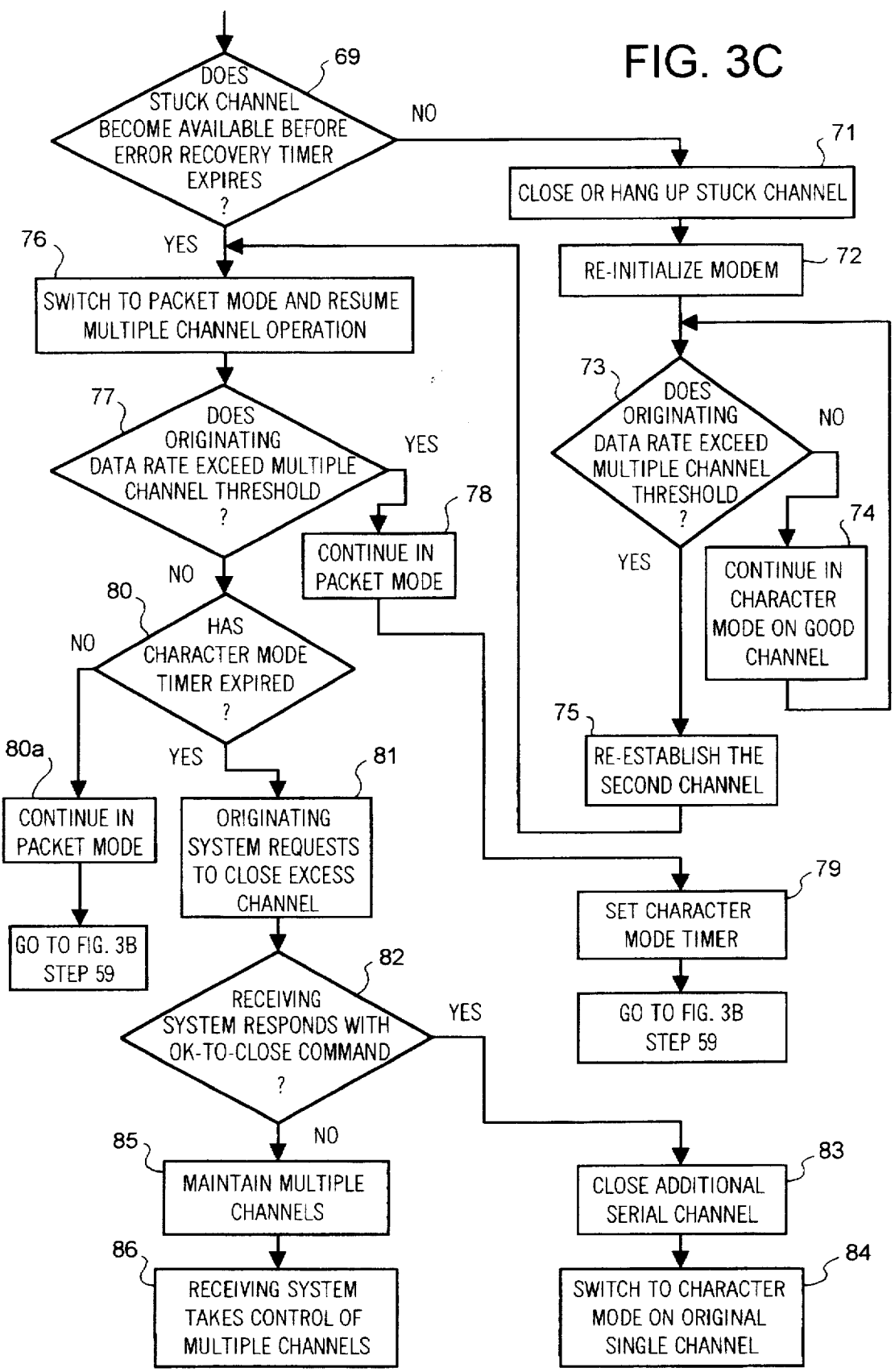

FIGS. 3A-3C are a flow chart illustrating the steps performed by the originating dual-channel asynchronous data transfer system 10 when performing the method of the present invention. Referring first to FIG. 3A, the process sets up the originating system as a serial card in character mode at step 41. At step 42, the packet mode timer 27 is set to a predetermined time period. At step 43, it is determined whether or not the receiving system 26 is also a dual-channel asynchronous data transfer system. If not, the process moves to step 44 and continues to transmit in character mode. If, however, the receiving system is a dual-channel asynchronous data transfer system, the process moves from step 43 to step 45 where it is determined whether or not the data rate at the originating system 10 exceeds the data rate threshold for multiple channel operation. If not, the process moves to step 46 and continues to transmit in character mode, and sets the packet mode timer 27. If, however, the data rate at the originating system 10 exceeds the data rate threshold, the process moves from step 45 to step 47 where it is determined whether or not the packet mode timer 27 has expired. If not, the process moves to step 48 and continues to transmit in character mode. If, however, the packet mode timer 27 has expired, the process moves from step 47 to step 49 where the originating system 10 sends a packet mode request command to the receiving system 26, requesting to switch to packet mode and add an additional channel.

The process then moves to step 51 where it is determined whether or not the receiving system 26 desires to switch to packet mode. If not, the process moves to step 52 and continues to transmit in character mode. The originating system then waits for 15 seconds and again sends a packet mode request command to the receiving system. This continues until the receiving system 26 indicates that it will switch to packet mode. The process then moves from step 51 to step 54 where the character mode timer 32 is set to a predetermined time period. The process then moves to FIG. 3B, step 55.

At step 55, the originating system 10 sends a dial stream to the second modem 17. The second modem makes a connection to the second modem in the receiving system 26 and opens a second channel at 56. At step 57, the originating system 10 switches to packet mode and starts sending data across both channels at 58. At step 59, it is determined whether or not eight packets in a row have been transmitted on one channel. If not, the process moves to FIG. 3C, step 77. If, however, eight packets in a row have been transmitted on one channel, the process moves from step 59 to step 62 where the stuck channel timer 28 is started. At 63, the process waits for a predetermined time period and then determines at 64 whether or not the stuck channel has become available. If the stuck channel is available, the process moves to step 65 and transmits packets on the newly available channel.

If, however, the stuck channel is not available, the process moves from step 64 to step 66 where the originating system 10 flushes packets not marked for re-use or ACK'ed by the receiving system 26. The originating system then switches to character mode on the last channel used at 67. The process then moves to 68 and starts the error-recovery timer 29. The process then moves to FIG. 3C, step 69.

At step 69, it is determined whether or not the stuck channel becomes available before the error-recovery timer 29 expires. If not, the process moves to step 71 where the originating system 10 closes or hangs up the stuck channel. The modem for the stuck channel is then re-initialized at 72. The process then moves to step 73 where it is determined whether or not the data rate at the originating system exceeds the data rate threshold for multiple channel operation. If not, the process moves to step 74 and the originating system continues in character mode on the good channel. The process then continues to monitor the data rate at step 73.

If the data rate at the originating system exceeds the data rate threshold for multiple channel operation at 73, the process moves to step 75 where the second channel is re-established. The process then moves to step 76. Likewise, if the stuck channel becomes available before the error-recovery timer 29 expires at step 69, the process moves to step 76 where the originating system 10 switches to packet mode and resumes multiple channel operation. The process then moves to step 77 and monitors the data rate. If the data rate remains above the data rate threshold, the originating system continues in packet mode at 78. The process then sets the character mode timer 32 at step 79, and returns to FIG. 3B, step 59. If, however, the data rate drops below the threshold for multiple channel operation at 77, the process moves to step 80 where it is determined whether or not the character mode timer 32 has expired. If not, the process moves to step 80a and continues in packet mode. The process then returns to FIG. 3B, step 59. If, however, the character mode timer has expired at step 80, the process moves to step 81 where the originating system 10 requests permission from the receiving system 26 to close the excess channel.

At step 82 it is determined whether or not the receiving system responded with an OK-to-close command, granting permission to close the excess channel. If so, the process moves to step 83 where the originating system 10 closes the additional serial channel. The process then moves to 84 where the originating system switches to character mode on the original single channel. If, however, the receiving system does not respond with an OK-to-close command at 82, the process moves to step 85 where the multiple channels are maintained. At step 86, the receiving system 10 takes control of the multiple channels, and is responsible for closing the excess channel if the data rate drops below the data rate threshold for multiple channel operation.

Figure 4:
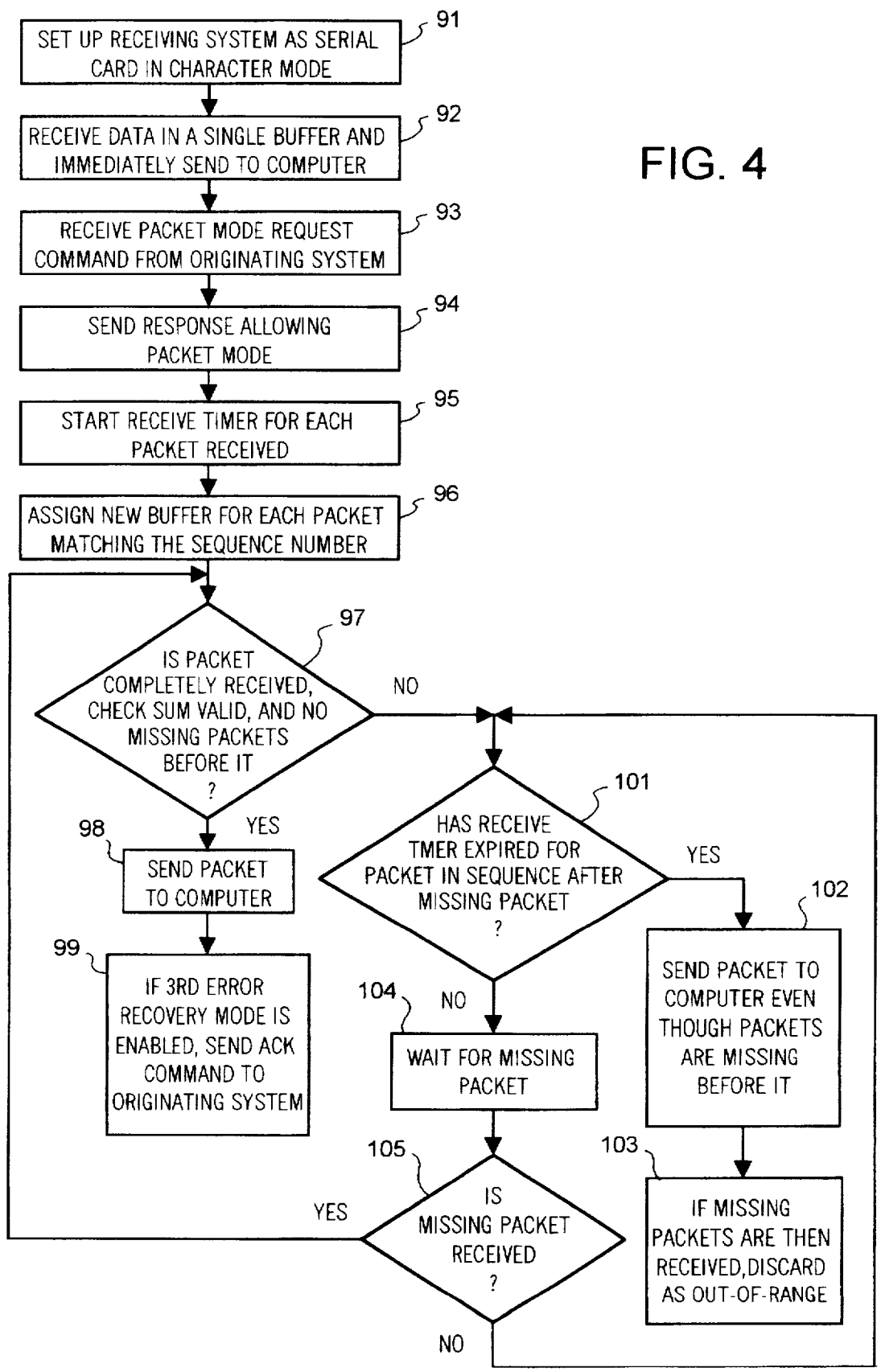
FIG. 4 is a flow chart illustrating the steps performed by a receiving dual-channel asynchronous data transfer system when performing the method of the present invention.

FIG. 4 is a flow chart illustrating the steps performed by the receiving dual-channel asynchronous data transfer system 26 when performing the method of the present invention. At step 91 the receiving system 26 is set up as a serial card in character mode. At 92, the receiving system receives data into a single buffer memory and then immediately sends the data to the receiving computer 30. At 93, the receiving system receives a packet mode request from the originating system. At 94, the receiving system sends a response to the originating system allowing a switch to packet mode. At 95, the process starts the receive timer 31 for each packet received. Each packet is assigned to a new buffer which matches the sequence number of the packet at 96. The process then moves to step 97 where it is determined whether or not each received packet is completely received, the packets check sum is valid, and there are no missing packets before the received packet. If so, the process moves to step 98 and sends the packet to the receiving computer 30. If the third error-recovery mode is engaged, the receiving system sends an ACK command to the originating system.

If, however, at step 97 there was a missing packet before the packet received, the process moves to step 101 where it is determined whether or not the receive timer 31 has expired for the packet in sequence after the missing packet. If the receive timer 31 has expired, the process moves to step 102 and sends the received packet to the receiving computer 30, even though a packet is missing before it. If the missing packet is later received, the missing packet is discarded as an out-of-range packet at step 103.

If, however, at step 101 it was determined that the receive timer 31 had not expired, the process moves to step 104 and waits for the missing packet to be received. If it is determined at 105 that the missing packet is not received, the process returns to step 101. If, however, it is determined at 105 that the missing packet is received, the process returns to step 97 and ensures that the received packet is completely received, the packet's check sum is valid, and there are no missing packets before the received packet.

It is thus believed that the operation and construction of the present invention will be apparent from the foregoing description. While the method, apparatus and system shown and described has been characterized as being preferred, it will be readily apparent that various changes and modifications could be made therein without departing from the spirit and scope of the invention as defined in the following claims.

What is claimed is:

1. A method of asynchronously transmitting data from an originating system to a receiving system over first and second channels, said method comprising the steps of:

determining an originating data rate at said originating system;

setting a threshold data rate;

transmitting data in character mode on said first channel when said originating data rate is below said threshold data rate; and transmitting data in packet mode on said first and second channels when said originating data rate is above said threshold data rate.

2. The method of asynchronously transmitting data from an originating system to a receiving system of claim 1 further comprising the steps of:

continuously monitoring said originating data rate while transmitting data;

dynamically switching from character mode to packet mode when said originating data rate changes from below said threshold data rate to above said threshold data rate; and dynamically switching from packet mode to character mode when said originating data rate changes from above said threshold data rate to below said threshold data rate.

3. The method of asynchronously transmitting data from an originating system to a receiving system of claim 2 wherein said step of transmitting data in packet mode on said first and second channels includes the steps of:

transmitting more data over said first channel when said first channel is faster than said second channel; and transmitting more data over said second channel when said second channel is faster than said first channel.

4. The method of asynchronously transmitting data from an originating system to a receiving system of claim 3 wherein said step of dynamically switching from character mode to packet mode when said originating data rate changes from below said threshold data rate to above said threshold data rate includes the steps of:

determining whether said receiving system is capable of receiving in packet mode over two channels; and obtaining permission from said receiving system to connect said second channel and switch to packet mode.

5. The method of asynchronously transmitting data from an originating system to a receiving system of claim 4 wherein said step of dynamically switching from packet mode to character mode when said originating data rate changes from above said threshold data rate to below said threshold data rate includes the steps of:

measuring a predetermined time period during which said originating data rate remains below said threshold data rate;

sending a request from said originating system to said receiving system to close said second channel;

receiving a response from said receiving system granting permission to close said second channel;

closing said second channel; and switching to character mode.

6. The method of asynchronously transmitting data from an originating system to a receiving system of claim 3 further comprising receiving data in said receiving system, said receiving step including the steps of:

receiving data into a single buffer when said data is transmitted in character mode; and receiving data into a plurality of buffers when said data is transmitted in packet mode.

7. The method of asynchronously transmitting data from an originating system to a receiving system of claim 6 wherein said step of transmitting data in packet mode on said first and second channels when said originating data rate is above said threshold data rate includes the steps of:

transmitting a plurality of data packets; and identifying each of said plurality of data packets with a sequence number.

8. The method of asynchronously transmitting data from an originating system to a receiving system of claim 7 wherein said step of receiving data into a plurality of buffers when said data is transmitted in packet mode includes the steps of:

assigning a sequence number to each of said plurality of buffers; and storing each of said plurality of received data packets in one of said plurality of buffers having a matching sequence number.

9. The method of asynchronously transmitting data from an originating system to a receiving system of claim 8 further comprising the steps of:

connecting said originating system to a first serial device; and connecting said receiving system to a second serial device.

10. The method of asynchronously transmitting data from an originating system to a receiving system of claim 9 further comprising the steps of:

sending one of said plurality of received data packets from said receiving system to said second serial device when said received data packet is completely received, a check sum in said received data packet is valid, and there are no missing data packets before said received data packet.

11. The method of asynchronously transmitting data from an originating system to a receiving system of claim 10 further comprising the steps of:

starting a receive timer when each of said plurality of data packets is received in said receiving system;

determining that one of said plurality of data packets is missing;

determining that said receive timer has expired for one of said plurality of received data packets having a sequence number immediately following the sequence number of said missing data packet; and sending said received data packet having a sequence number immediately following the sequence number of said missing data packet to said second serial device.

12. The method of asynchronously transmitting data from an originating system to a receiving system of claim 11 further comprising, after the step of sending said received data packet having a sequence number immediately following the sequence number of said missing data packet to said second serial device, the steps of:

receiving said missing data packet in said receiving system; and discarding said received missing data packet as an out-of-range data packet.

13. A device for asynchronously transmitting data from an originating system to a receiving system over first and second channels, said device comprising:

means for determining an originating data rate at said originating system;

means for setting a threshold data rate;

means for transmitting data in character mode on said first channel when said originating data rate is below said threshold data rate; and means for transmitting data in packet mode on said first and second channels when said originating data rate is above said threshold data rate.

14. The device for asynchronously transmitting data from an originating system to a receiving system of claim 13 further comprising:

means for continuously monitoring said originating data rate while transmitting data;

means for dynamically switching from character mode to packet mode when said originating data rate changes from below said threshold data rate to above said threshold data rate; and means for dynamically switching from packet mode to character mode when said originating data rate changes from above said threshold data rate to below said threshold data rate.

15. The device for asynchronously transmitting data from an originating system to a receiving system of claim 14 wherein said means for dynamically switching from character mode to packet mode when said originating data rate changes from below said threshold data rate to above said threshold data rate includes:

means for determining whether said receiving system is capable of receiving in packet mode over two channels; and means for obtaining permission from said receiving system to connect said second channel and switch to packet mode.

16. The device for asynchronously transmitting data from an originating system to a receiving system of claim 15 wherein said means for dynamically switching from packet mode to character mode when said originating data rate changes from above said threshold data rate to below said threshold data rate includes:

a character mode timer for measuring a predetermined time period during which said originating data rate remains below said threshold data rate;

means for sending a request from said originating system to said receiving system to close said second channel;

means for receiving a response from said receiving system granting permission to close said second channel;

means for closing said second channel; and means for switching to character mode.

17. The device for asynchronously transmitting data from an originating system to a receiving system of claim 14 further comprising means for receiving data in said receiving system, said receiving means including:

a single buffer for receiving data when said data is transmitted in character mode; and a plurality of buffers for receiving data when said data is transmitted in packet mode.

18. The device for asynchronously transmitting data from an originating system to a receiving system of claim 17 wherein said means for transmitting data in packet mode on said first and second channels when said originating data rate is above said threshold data rate includes:

means for transmitting a plurality of data packets; and means for identifying each of said plurality of data packets with a sequence number.

19. The device for asynchronously transmitting data from an originating system to a receiving system of claim 18 wherein said means for receiving data into a plurality of buffers when said data is transmitted in packet mode includes:

means for assigning a sequence number to each of said plurality of buffers; and means for storing each of said plurality of data packets in one of said plurality of buffers having a matching sequence number.

20. The device for asynchronously transmitting data from an originating system to a receiving system of claim 19 further comprising:
 a first connector for connecting said originating system to a first external serial device; and
 a second connector for connecting said receiving system to a second external serial device.

21. The device for asynchronously transmitting data from an originating system to a receiving system of claim 20 further comprising means for sending one of said plurality of received data packets from said receiving system to said second external serial device when said received data packet is completely received, a check sum in said received data packet is valid, and there are no missing data packets before said received data packet.

22. The device for asynchronously transmitting data from an originating system to a receiving system of claim 21 further comprising:
 a receive timer for measuring a time period beginning when each of said plurality of data packets is received in said receiving system;
 means for determining that one of said plurality of received data packets is missing;
 means for determining that said receive timer has expired for one of said plurality of received data packets having a sequence number immediately following the sequence number of said missing data packet; and
 means for sending said received data packet having a sequence number immediately following the sequence number of said missing data packet to said second external serial device.

* * * * *